United States Patent [19]

Schneider et al.

[11] Patent Number: 5,783,161
[45] Date of Patent: Jul. 21, 1998

[54] STABILIZED HYROXYLAMINE SOLUTIONS

[75] Inventors: Hans-Michael Schneider, Worms; Bernd Leutner, Frankenthal, both of Germany

[73] Assignee: BASF Aktiengesellschaft, Ludwigshafen, Germany

[21] Appl. No.: 684,910

[22] Filed: Jul. 25, 1996

[51] Int. Cl.$^6$ ............................................. C01B 21/20
[52] U.S. Cl. ............................................. 423/265; 423/387
[58] Field of Search ............................ 423/265, 387

[56] References Cited

U.S. PATENT DOCUMENTS 3,544,270  12/1970  Carlos .................................. 423/387

*Primary Examiner*—Wayne Langel
*Attorney, Agent, or Firm*—Keil & Weinkauf

[57] ABSTRACT

The present invention relates to stabilized hydroxylamine solutions comprising as stabilizer at least one compound of the formula I $$R^1R^2N-A-NR^3R^4 \quad (I)$$

in which A and $R^1$ to $R^4$ are as defined in the description.

14 Claims, No Drawings

STABILIZED HYROXYLAMINE SOLUTIONS

The present invention relates to stabilized hydroxylamine solutions.

Hydroxylamine, especially in the form of its salt with sulfuric acid, is an important intermediate for the chemical industry, and is widely employed in chemical syntheses. It is frequently necessary to employ hydroxylamine in the form of a solution of the free base, which is generally liberated from a hydroxylammonium salt such as, for example, hydroxylammonium sulphate or hydroxylammonium chloride, by the action of an appropriate base, such as ammonia, sodium hydroxide solution or an alcoholate. Neutral and alkaline hydroxylamine solutions are unstable and decompose to form ammonia, nitrogen, oxides of nitrogen and water, so that their transportation or storage is highly problematic. The rate of decomposition increases with rising temperature, rising pH and rising concentration of catalytically active impurities.

In order to avoid the decomposition of the hydroxylamine, a stabilizer is added to the solutions. Numerous stabilizers for hydroxylamine are already known. Proposals which have been made are: thioglycolic acid (JP-A-58069843), glycerol monoethers and ethylene oxide adducts thereof (DE-A-29 19 554), hydroxyanthraquinones (DE-A-33 43 600), hydroxyquinolines (DE-A-33 45 734), polyhydroxyhexano-1,4-lactone (DE-A-33 45 733), anthocyanins (DE-A-33 47 260), hydroxyquinaldines, flavones, benzonitrile, N-phenyl-N-hydroxythiourea (DE-A-36 01 803), flavans (DE-A-33 43 599), thiosulfates, mercaptobenzothiazoles, mercaptoalkanols, mercaptothiazolines, thiuram disulfides, thioureas (EP-A-516 933), the tetrasodium salt of ethylenediaminetetraacetic acid, the trisodium salt of N-hydroxyethylenediaminetriacetic acid, polyvinylpyrrolidone or poly-N-vinyl-5-ethyl-2-oxazolidinone (U.S. Pat. No. 3,145,082), amide oximes (U.S. Pat. No. 3,480,391), hydroxamic acids (U.S. Pat. No. 3,480,391), hydroxyureas (U.S. Pat. No. 3,544,270), dipyridyl compounds (JP-A-58069842), aminoquinolines (JP-A-58069844), phenanthrolines (JP-A-58069841), and polyhydroxyphenols (JP-A-4878099).

However, none if the stabilizers proposed to date has been able to provide hydroxylamine solutions with sufficient stabilization for no notable decomposition of the hydroxylamine to occur, especially during storage.

It is therefore an object of the present invention to provide a better means of stabilizing hydroxylamine solutions. We have now found that this object is achieved, surprisingly, by using as stabilizer at least one compound of the formula I:

$$R^1R^2N-A-NR^3R^4 \quad (I)$$

in which

A is alkylene, alkenylene, alkynylene, cycloalkylene, cycloalkenylene, arylene, o-, m- or p-xylylene, a 5- or 6-membered saturated or unsaturated heterocycle having a nitrogen atom, said radicals being able to contain 1, 2 or 3 substituents which are selected independently of one another from alkyl, alkoxy and hydroxyl, or is

in which

B and X are —$CH_2CH_2$— or —$CH_2CH_2CH_2$—,
n is 10–50,000,

R is H, alkyl, ethylene or propylene which is substituted by OH, $NH_2$, $NHCOR^5$ or COOH, or is CSSH, $CH_2CN$ or $CH_2PO_3H_2$, or is a bridge to a nitrogen atom of another polyethyleneimine or polypropyleneimine chain, the bridge being formed by

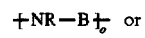 or

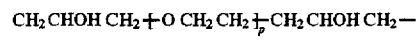

where o and p independently of one another are 1–15,
$R^5$ is H, $C_1$–$C_{18}$-alkyl or $CHR^6COR^6$ where $R^6$ is $C_{12}$–$C_{18}$-alkyl,
$R^1$, $R^2$, $R^3$ and $R^4$ independently of one another are H, $CH_2COOH$, $CH_2PO_3H_2$, alkyl, acyl, $CH_2CH_2OH$, $CH_2CH_2NH_2$ or

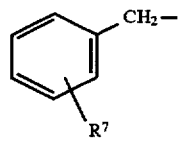

where
$R^7$ is OH, SH, $NH_2$, CN, COOH, alkyl or alkoxy, or the salts thereof, with the exceptions of ethylenediaminetetraacetic acid and N-hydroxyethylenediaminetriacetic acid and salts thereof.

The present invention therefore provides stabilized hydroxylamine solutions comprising hydroxylamine and at least one compound of the formula I.

The novel solutions comprise hydroxylamine in essentially pure form as a free base or as an at least partially neutralized hydroxylamine salt; in other words, free hydroxylamine is mixed with the hydroxylamine salt.

The stabilizers employed in accordance with the invention can be used to stabilize all types of hydroxylamine solutions. They may be aqueous solutions or solutions of hydroxylamine in an organic solvent such as methanol, ethanol, n-propanol, isopropanol, acetone, tetrahydrofuran, etc., or may be mixtures of water and organic solvents. The stabilizers employed in accordance with the invention are also soluble in the solvents in which hydroxylamine is soluble. If appropriate, solubility can be obtained by the choice of appropriate groups $R^1$ to $R^4$ and A.

Hydroxylamine solutions are in general obtained by reacting a hydroxylammonium salt, especially hydroxylammonium sulfate, hydroxylammonium chloride and hydroxylammonium phosphate, with an appropriate base, such as ammonia, sodium hydroxide, potassium hydroxide or calcium hydroxide. In the case of complete neutralization of the hydroxylammonium salt a solution is obtained which comprises free hydroxylamine and the salt derived from the base cation and the acid anion which is present in the hydroxylammonium salt. The salt can be separated off completely or partially. The hydroxylammonium salt can also be neutralized only partially with the base. In this case a solution is obtained which comprises not only free hydroxylamine and the salt mentioned but also unreacted hydroxylammonium salt. All of these solutions can be stabilized in accordance with the invention, the nature of the anion in the hydroxylammonium salt not being critical.

In the context of the present invention, alkyl in a straight-chain or branched radical of preferably 1 to 18 carbon atoms, especially 1 to 6 carbon atoms and, in particular, 1 to 4 carbon atoms. The same comments apply to the alkyl group in alkoxy.

Alkylene is a straight-chain or branched divalent radical of, preferably, 2 to 6 carbon atoms, especially 2 to 4 carbon atoms.

Alkenylene and alkynylene are straight-chain or branched divalent radicals of, preferably, 3 to 6 carbon atoms and, in particular, 3 or 4 carbon atoms.

Cycloalkylene and cycloalkenylene are preferably cyclopentylene or cyclohexylene or, respectively, cyclopentenylene or cyclohexenylene.

Arylene is preferably an aromatic $C_6$–$C_{10}$ hydrocarbon radical or phenylene.

The saturated or unsaturated heterocycle is preferably pyrrolidinylene, piperidinylene, pyrrolylene or pyridinylene. The heterocycle is attached by carbon atoms to the two nitrogen atoms of the formula I.

Acyl is straight-chain or branched and preferably has 1 to 19 carbon atoms.

A is preferably alkylene, cycloalkylene, arylene or

and in particular is alkylene, cycloalkylene or

In this case the radicals $R^1$ to $R^4$ independently of one another are preferably $CH_2COOH$, $CH_2CH_2OH$, $CH_2CH_2NH_2$ or

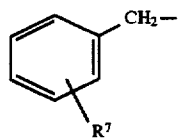

and in particular are $CH_2COOH$ or

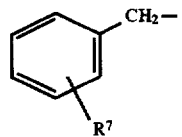

$R^7$ is preferably in the ortho position and in particular is OH, COOH or a branched (bulky) alkyl radical, such as isopropyl, tert-butyl etc.

The stabilizers according to the invention can also be employed in the form of salts. Particularly suitable salts are alkali metal salts, such as sodium salts or potassium salts, or ammonium salts, if acidic functions are present, including the salts with amines, such as triethylamine or triethanolamine, and with hydroxylamine. The latter may arise if the compounds of the formula I are introduced into the hydroxylamine solution to be stabilized. Also suitable are acid addition salts with inorganic acids, such as HF, HCl, HBr, $H_2SO_4$, $H_3PO_4$, etc., if basic functions are present.

A further preferred embodiment is a stabilized solution comprising as stabilizer a compound of the formula I in which A is alkylene or cycloalkylene and $R^1$ to $R^4$ independently of one another are $CH_2COOH$, $CH_2CH_2OH$ or

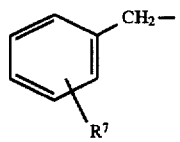

where $R^7$ is as defined above and in particular is OH, SH or $NH_2$.

If A is

the compounds of the formula I are polyethyleneimine or polypropyleneimine polymers, which are in general weakly crosslinked. The repeating units of said formula may be identical or different. This applies in particular when units are present which are substituted on the nitrogen atom, i.e. R is other than hydrogen in at least some of the units. The chosen degree of substitution can lie within a wide range and is in general in the range from 5 to 98%. The slight crosslinking which is the result of the preparation of the polyethyleneimines and polypropyleneimines can be increased by polyether bridges between the polymers. The polyether bridge is formed by alkylating some of the nitrogen atoms with epichlorohydrine followed by ethoxylation.

In the case of polyethyleneimine or polypropyleneimine polymers, the radicals $R^1$ to $R^4$ are preferably H or alkyl.

The weight average molecular weight of the polymers can be chosen within a wide range, and is generally in the range from 800 to 2,000,000, in particular from 1,000 to 1,500,000 and, in the case of more highly crosslinked polymers, in the range from 50,000 to 2,000,000.

In accordance with a further preferred embodiment, the stabilized 45 hydroxylamine solution comprises at least one compound of the formula I in which A is

B and X are $CH_2CH_2$—, R is $CH_2COOH$, $CH_2CH_2COOH$, $CH_2CH_2OH$, $CH_2CH_2NH_2$, $NHCOR^5$ or CSSH or is a bridge as defined above, $R^5$ is as defined above and $R^1$ to $R^4$ are H or alkyl.

Particularly preferred compounds in this context are:

a weakly crosslinked polyethyleneimine with an average molecular weight in the range from 1,000 to 2,000,000;

carboxymethylated polyethyleneimines with a degree of substitution of from 25 to 98% and an average molecular weight in the range from 1,500 to 1,500,000;

carboxyethylated polyethyleneimines with a degree of substitution of from 5 to 50% and an average molecular weight in the range from 1,000 to 1,500,000;

partially amidated polyethyleneimines (one or two of the radicals $R^1$ to $R^4$ are $C_1$ to $C_{19}$-acyl) with a degree of substitution of from 5 to 50% and an average molecular weight in the range from 1,000 to 1,500,000;

polyether-crosslinked polyethyleneimines with an average molecular weight in the range from 50,000 to 1,500,000;

hydrophobically modified polyethyleneimines (R=— $CH_3CH_2NHCOR^5$, where $R^5$ is $CHR^6COR^6$ and $R^6$ is $C_{12}$ to $C_{18}$-alkyl, especially hexadecyl) with a degree of substitution of from 1 to 7% and an average molecular weight in the range from 1,500 to 1,500,00 [sic]. These polymers are obtainable by reacting the corresponding ethyleneimines (R=$CH_2CH_2NH_2$) with the corresponding alkyl diketenes;

hydroxyethyl-substituted polyethyleneimines with a degree of substitution of 80 to 100% and an average molecular weight in the range from 1 to 2,000,000;

polyethyleneimine dithiocarbamates (R=CSSH) with a degree of substitution of from 30 to 60% and an average molecular weight of from 2,000 to 1,000,000, and the sodium salts thereof.

Some of the above polyethyleneimines are commercially obtainable, and are marketed, for example, by BASF AG under the name LUPASOL®.

According to a further preferred embodiment the stabilized hydroxylamine solution comprises as stabilizer a compound of the formula I in which A is cyclohexylene or —CH$_2$CH$_2$— and R$^1$ to R$^4$ are CH$_2$COOH or

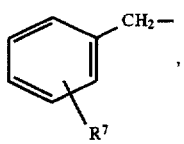

preferably CH$_2$COOH, where R$^7$ is OH, SH, NH$_2$ or COOH.

With particular preference these compounds are trans-1,2-diaminocyclohexane-N,N,N',N'-tetraacetic acid and/or N,N'-di(2-hydroxybenzyl)ethylenediamine-N,N'-diacetic acid and the salts thereof. The compounds of the formula I are known and commercially available or can be prepared by analogy with known methods.

The novel stabilized hydroxylamine solutions comprise the compounds of formula I in a quantity which is sufficient for stabilization. They preferably contain from 0.001 to 20% by weight (from 10 to 200,000 ppm), in particular from 0.001 to 10% by weight, particularly preferably from 0.01 to 5% by weight, very particularly preferably from 0.02 to 2% by weight, of a compound of the formula I, based on the hydroxylamine content. The concentration of hydroxylamine is in general 1–100% by weight, in particular 1–70% by weight, based on the overall weight of the solution.

The stabilizer can be added prior to or following neutralization of the hydroxylamine salt, but preferably prior to the neutralization.

The compounds of the formula I are effective in a wide temperature range. For instance, they stabilize hydroxylamine solutions at from −20° C. to 130° C., preferably at −10° C.–100° C. However, they are also suitable as stabilizers at markedly higher temperatures, under the pressures which are necessary to liquefy the solution.

The examples which follow illustrate the invention without limiting it. The determination of the hydroxylamine concentrations which is carried out in the examples is done by redox titration.

EXAMPLES:

20 ml of 50% strength aqueous hydroxylamine solution were charged to a 50 ml round-bottomed glass flask, and 500 ppm (m/m) of stabilizer of formula I, based on the mass of hydroxylamine, were added in each case. The flask was maintained at room temperature or heated with an oil bath to 100° C. and maintained at this temperature. The hydroxylamine contents of the stabilized solutions at room temperature and at 100° C. were determined by redox titration after defined periods. For this purpose, defined quantities of sample were withdrawn from the solutions, boiled for 5 minutes with excess ammonium iron(III) salt solution in sulfuric acid, and the iron(II) salt formed was back-titrated with cerium(IV) salt solution. The end point was determined potentiometrically.

Table 1 gives the results at room temperature while Table 2 gives those at 100° C. In order to demonstrate the outstanding stabilizing action of the compounds of formula I on hydroxylamine solutions, measurements with unstabilized hydroxylamine solutions, and with hydroxylamine solutions stabilized using ethylenediaminetetraacetic acid (EDTA), are shown for comparison.

TABLE 1

Room temperature

| Compound | Time [d] | Hydroxylamine content [%] |
| --- | --- | --- |
| Polyethyleneimine (unsubstituted, branched, MW ~ 800) | 27 | 48.1 |
| Polyethyleneimine (carboxyethylated, branched, MW ~ 1000) | 30 | 47.7 |
| Polyethyleneimine (carboxyethylated, branched, MW ~ 1 million) | 30 | 48.4 |
| N,N'-Di(2-hydroxybenzyl)ethylenediamine-N,N'-diacetic acid | 29 | 45.4 |
| Trans-1,2-diaminocyclohexane-N,N,N',N'-tetraacetic acid | 31 | 48.6 |
| unstabilized | 31 | 38.0 |
| EDTA | 30 | 17 |

MW = Molecular weight

TABLE 2

100° C.

| Compound | Time [h] | Hydroxylamine content [%] |
| --- | --- | --- |
| Polyethyleneimine (unsubstituted, branched, MW ~ 800) | 6 | 47.8 |
| Polyethyleneimine (amidated, branched, MW ~ 4000) | 6 | 47.0 |
| Polyethyleneimine (carboxyethylated, branched, MW ~ 1000) | 6 | 49.5 |
| Polyethyleneimine (carboxyethylated, branched, M ~ 1 million) | 6 | 48.5 |
| Trans-1,2-Diaminocyclohexane-N,N,N',N'-tetraacetic acid | 6 | 49.9 |
| unstabilized | 6 | 38.5 |
| EDTA | 6 | 20 |

It is evident that the hydroxylamine concentration of the unstabilized samples has dropped sharply. The concentration of the samples to which the known stabilizer EDTA has been added has, indeed, fallen even more greatly than that of the unstabilized samples. In contrast, the concentration of the samples stabilized in accordance with the invention has fallen only slightly.

25 g/ka

We claim:

1. A stabilized hydroxylamine solution which comprises as stabilizer at least one compound of the formula I

R$^1$R$^2$N—A—NR$^3$R$^4$ (I)

in which

A is a radical selected from the group consisting of alkylene, alkynylene, cycloalkylene, cycloalkenylene, arylene, o-, - or p-xylylene, a 5- or 6-membered saturated and unsaturated heterocycle having a nitrogen atom, said radicals optionally containing 1, 2 or 3 substituents selected from the group consisting of alkyl, alkoxy and hydroxyl, or A is —X—[—NR—B—]$_n$ in which B and X are —CH$_2$CH$_2$— or —CH$_2$CH$_2$CH$_2$—, n is 10–50,000, R is H, alkyl, ethylene or propylene which is substituted by OH, NH$_2$, NHCOR$^5$ or COOH, or is CSSH, CH$_2$CN or CH$_2$PO$_3$H$_2$, or is a bridge to a nitrogen atom of another polyethyleneimine or polypropyleneimine chain, the bridge being formed by $+NR-B+_o$ or CH$_2$CHOHCH$_2+$OCH$_2$CH$_2+_p$CH$_2$CHOHCH$_2-$ where o and p independently of one another are 1–15, R$^5$ is H, C$_1$–C$_{18}$-alkyl or CHR$^6$COR$^6$ where R$^6$ is C$_{12}$–C$_{18}$-alkyl, R$^1$, R$^2$, R$^3$ and R$^4$ independently of one another are H, CH$_2$COOH, CH$_2$PO$_3$H$_2$, alkyl, acyl, CH$_2$CH$_2$OH, CH$_2$CH$_2$NH$_2$ or
where

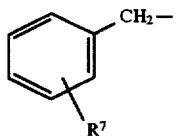

R$^7$ is OH, SH, NH$_2$, CN, COOH, alkyl or alkoxy,
or the salts thereof, with the exception of ethylenediaminetetraacetic acid and N-hydroxyethylenediaminetriacetic acid and salts thereof.

2. A stabilized hydroxylamine solution as defined in claim 1, wherein the stabilizer is at least one compound of the formula I or a salt thereof in which A is alkylene, alkenylene, cycloalkylene, arylene or $X+NR-B+_n$ B and X are —CH$_2$CH$_2$— and n, R, and R$^1$ to R$^4$ are as defined in claim 1.

3. A stabilized hydroxylamine solution as claimed in claim 2, wherein the stabilizer is at least one compound of the formula I or a salt thereof in which A is alkylene, cycloalkylene or $X+NR-B+_n$ and B, X, n and R$^1$ to R$^4$ are as defined in claim 2.

4. A stabilized hydroxylamine solution as claimed in claim 1, wherein the stabilizer is at least one compound of the formula I or a salt thereof in which A is alkylene or cycloalkylene and R$^1$ to R$^4$ independently of one another are CH$_2$COOH, CH$_2$PO$_3$H$_2$ or

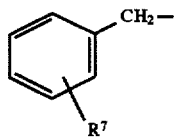

where R$^7$ is as defined in claim 1.

5. A stabilized hydroxylamine solution as claimed in claim 4, wherein the stabilizer is at least one compound of the formula I or a salt thereof in which A is cyclohexylene or —CH$_2$CH$_2$— and R$^1$ to R$^4$ independently of one another are CH$_2$COOH or

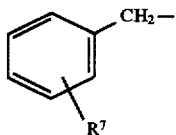

where R$^7$ is OH, SH, NH$_2$ or COOH.

6. A stabilized hydroxylamine solution as claimed in claim 5, wherein the stabilizer is trans-1,2-diaminocyclohexane-N,N,N',N'-tetraacetic acid and/or N,N'-di(2-hydroxybenzyl)ethylenediamine-N,N'-diacetic acid.

7. A stabilized hydroxylamine solution as claimed in claim 1, wherein the stabilizer is at least one compound of the formula I or a salt thereof in which A is $X+NR-B+_n$ B and X are —CH$_2$CH$_2$—,
n is 10 to 50,000,
R is CH$_2$COOH, CH$_2$CH$_2$COOH, CH$_2$CH$_2$OH, CH$_2$CH$_2$NH$_2$, NHCOR$^5$ or CSSH or is a bridge as defined in claim 1 to a nitrogen atom of another polyethyleneimine or polypropyleneimine chain,
R$^5$ is as defined in claim 1 and
R$^1$ to R$^4$ independently of one another are H, alkyl or C$_1$–C$_{19}$-acyl.

8. A stabilized hydroxylamine solution as defined in claim 1, which comprises as stabilizer the hyroxylamine salt of a compound of the formula I containing acidic groups.

9. A stabilized hydroxylamine solution as defined in claim 1, which contains 0.001–20% by weight, of stabilizer, based on hydroxylamine.

10. A stabilized hydroxylamine solution as defined in claim 1, which contains 0.001–10% by weight of stabilizer, based on hydroxylamine.

11. A stabilized hydroxylamine solution as defined in claim 1, which contains 0.001–5% by weight of stabilizer, based on hydroxylamine.

12. A stabilized hydroxylamine solution as defined in claim 1, which contains 0.02–2% by weight of stabilizer, based on hydroxylamine.

13. A stabilized hydroxylamine solution which is obtained by adding at least one compound of the formula I as defined in claim 1 as stabilizer to a hydroxylamine solution.

14. A method of stabilizing hydroxylamine solutions, which comprises adding at least one compound of the formula I as defined in claim 1 to a hydroxylamine solution which is to be stabilized.

* * * * *

UNITED STATES PATENT AND TRADEMARK OFFICE
CERTIFICATE OF CORRECTION

PATENT NO.: 5,783,161

DATED: July 21, 1998

INVENTOR(S): SCHNEIDER et al.

It is certified that error appears in the above-identified patent and that said Letters Patent is hereby corrected as shown below:

On the cover page, insert the following foreign priority information:

-- [30] Foreign Application Priority Data
Dec. 20, 1995 [DE] Germany .......... 195 47 759--.

Col. 7, claim 1, move "where" from line 19 to line 26 (after the formula).

Claims 3, 4, 5, 6, and 7, line 1 of each, "claimed" should be --defined--.

Signed and Sealed this

Twenty-ninth Day of September, 1998

*Attest:*

BRUCE LEHMAN

*Attesting Officer*     *Commissioner of Patents and Trademarks*